United States Patent [19]
Ngoc

[11] Patent Number: 5,927,029
[45] Date of Patent: Jul. 27, 1999

[54] COMPOSITION HAVING LOW COMPRESSION SET

[75] Inventor: Hung Dang Ngoc, Limeil Brevannes, France

[73] Assignee: The Goodyear Tire & Rubber Company, Akron, Ohio

[21] Appl. No.: 09/172,782

[22] Filed: Oct. 14, 1998

Related U.S. Application Data

[62] Division of application No. 08/829,864, Apr. 1, 1997, Pat. No. 5,859,132.

[51] Int. Cl.$^6$ .............................. E06B 3/00; C08L 31/00; C08F 12/08; C08C 19/00
[52] U.S. Cl. ........................ 52/204.5; 525/94; 525/233; 525/329.1; 525/331.8; 525/332.5; 525/333.3; 525/384
[58] Field of Search .......................... 525/94, 233, 329.1, 525/331.8, 332.5, 333.3, 384; 52/204.5

[56] References Cited

U.S. PATENT DOCUMENTS

| | | | |
|---|---|---|---|
| 4,927,882 | 5/1990 | Bayan | 525/99 |
| 5,362,787 | 11/1994 | Ngoc et al. | 524/297 |
| 5,380,785 | 1/1995 | Ngoc et al. | 524/504 |
| 5,415,940 | 5/1995 | Ngoc et al. | 428/424.4 |
| 5,462,993 | 10/1995 | Ngoc et al. | 525/274 |
| 5,552,460 | 9/1996 | Schmidt et al. | 525/171 |

FOREIGN PATENT DOCUMENTS

| | | |
|---|---|---|
| 410888 | 1/1991 | European Pat. Off. . |
| 52-019752 | 2/1977 | Japan . |
| 166739 | 6/1995 | Poland . |

*Primary Examiner*—Randy Gulakowski
*Attorney, Agent, or Firm*—Alvin T Rockhill

[57] ABSTRACT

Seals for automotive body applications (such as, windows, hoods, trunks and doors) and building applications (such as, window glazing gaskets and weather strips) should be dimensional stable, provide low compression set and offer outstanding sealing characteristics over a broad temperature range. They must be capable of sealing out noise, wind and water, while providing long-term ultraviolet light resistance. This invention discloses a polymeric composition having excellent characteristics for seals and gaskets including dimensional stability, low compression set and outstanding sealing characteristics, said polymeric composition being comprised of (1) a rubbery polymer which is comprised of repeat units which are derived from (a) butyl acrylate, (b) at least one member selected from the group consisting of methyl methacrylate, ethyl methacrylate, methyl acrylate and ethyl acrylate, (c) acrylonitrile, (d) styrene and (e) a crosslinking agent; (2) at least one thermoplastic resin; and (3) at least one polyhydroxy alcohol. Triethyleneglycol is a representative example of a preferred polyhydroxy alcohol.

18 Claims, No Drawings

5,927,029

COMPOSITION HAVING LOW COMPRESSION SET

This is a divisional of application Ser. No. 08/829,864, filed on Apr. 1, 1997, now U.S. Pat. No. 5,859,132.

BACKGROUND OF THE INVENTION

Seals for automotive body applications (such as, windows, hoods, trunks and doors) and building applications (such as window glazing gaskets and weather strips) should be dimensional stable, provide low compression set and offer outstanding sealing characteristics over a broad temperature range. Such seals must be capable of sealing out noise, wind and water, while providing long-term ultraviolet light resistance. At the same time, the material used in the seal must offer the degree of flexibility required for the particular application. Window and door weather stripping for automobiles and trucks is a high volume application for such seals. However, seals offering essentially the same characteristics are also needed for sun roof seals, handle gaskets, window spacers, window guides, lock seals, windshield wiper pivot seals and in building applications such as window glazing gaskets and weather seals.

Rubbery blends of polyvinyl chloride (PVC) with a nitrile rubber (NBR) have sometimes been used in seals for automotive body applications. The nitrile rubber is included in such blends as a permanent modifier for the PVC which provides it with a higher degree of flexibility. However, the utilization of standard nitrile rubber in such blends typically results in only moderate compression set characteristics. It is very important for seals to have good compression set characteristics in most applications. For instance, improved resistance to water leaks and wind noise can be attained by utilizing a seal which has low compression set characteristics.

It is known from the teachings of UK Patent Application No. 9214969.9 that low compression set characteristics can be improved by utilizing a technique known as "dynamic vulcanization" via free radical generators, such as azo compounds or organic peroxides. However, this "dynamic vulcanization" technique suffers from the weakness that the azo compounds or organic peroxides required reduce the thermal stability of the polyvinylchloride resin and the ultraviolet light resistance of the nitrile rubber. There is also an increased risk of early crosslinking during processing which leads to scorching and reduced recyclability.

U.S. Pat. No. 5,362,787 discloses a highly crosslinked nitrile rubber which can be easily blended with PVC to make compositions which have an excellent combination of properties for use in making seals and gaskets for automotive and building applications. The PVC blends made with such highly crosslinked nitrile rubbers offer excellent dispersion behavior, dimensional stability, low compression set, outstanding sealing characteristics, and low temperature flexibility.

U.S. Pat. No. 5,362,787 more specifically discloses a highly crosslinked nitrile rubber composition which can be blended with polyvinyl chloride to make compositions having excellent characteristics for seals and gaskets including dimensional stability, low compression set, outstanding sealing characteristics and good low temperature flexibility, said highly crosslinked nitrile rubber composition being comprised of (1) a highly crosslinked nitrile rubber having repeat units which are derived from (a) 1,3-butadiene, (b) acrylonitrile and (c) a crosslinking agent, wherein said highly crosslinked nitrile rubber has a Mooney viscosity of about 50 to about 120, a swelling index of less than about 10 percent, a mill shrinkage of less than 10 percent, and a gel content of greater than 90 percent; and (2) from about 1 to about 30 phr of a plasticizer.

U.S. Pat. No. 5,380,785, U.S. Pat. No. 5,415,940 and U.S. Pat. No. 5,462,993 disclose a rubbery polymer which can be blended with polyvinyl chloride to make leathery compositions having good heat and ultraviolet light resistance, said rubbery polymer being comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene, (e) a half ester maleate soap and (f) a crosslinking agent.

SUMMARY OF THE INVENTION

The present invention relates to a polymeric composition which has an excellent combination of properties for use in making seals and gaskets for automotive and building applications, such as window glazing gaskets. These polymeric compositions offer excellent dimensional stability, low compression set, outstanding sealing characteristics, low temperature flexibility, heat resistance and ultra-violet light resistance.

The present invention more specifically discloses a polymeric composition having excellent characteristics for seals and gaskets including dimensional stability, low compression set and outstanding sealing characteristics, said polymeric composition being comprised of a vulcanized blend of (1) a rubbery polymer which is comprised of repeat units which are derived from (a) butyl acrylate, (b) at least one member selected from the group consisting of methyl methacrylate, ethyl methacrylate, methyl acrylate and ethyl acrylate, (c) acrylonitrile, (d) styrene and (e) a crosslinking agent; (2) at least one thermoplastic resin; and (3) at least one polyhydroxy alcohol. The polyhydroxy alcohol is an organic compound which contains at least 2 hydroxyl groups (—OH groups).

The subject invention also reveals a window glazing gasket which is comprised of a vulcanized blend of (1) a rubbery polymer which is comprised of repeat units which are derived from (a) butyl acrylate, (b) at least one member selected from the group consisting of methyl methacrylate, ethyl methacrylate, methyl acrylate and ethyl acrylate, (c) acrylonitrile, (d) styrene and (e) a crosslinking agent; (2) at least one thermoplastic resin; and (3) at least one polyhydroxy alcohol.

The present invention further discloses a process for making a polymeric composition having excellent characteristics for seals and gaskets including dimensional stability, low compression set and outstanding sealing characteristics, said process being comprised of dynamically vulcanizing (1) a rubbery polymer which is comprised of repeat units which are derived from (a) butyl acrylate, (b) at least one member selected from the group consisting of methyl methacrylate, ethyl methacrylate, methyl acrylate and ethyl acrylate, (c) acrylonitrile, (d) styrene and (e) a crosslinking agent; (2) at least one thermoplastic resin; and (3) at least one polyhydroxy alcohol; wherein said dynamic vulcanization is conducted at an elevated temperature which is within the range of about 100° C. to about 220° C. under conditions of shear.

DETAILED DESCRIPTION OF THE INVENTION

Rubbery polymers which can be utilized in the polymeric compositions of this invention are described in U.S. Pat. No.

5,380,785, U.S. Pat. No. 5,415,940 and U.S. Pat. No. 5,462,993 which are incorporated herein by reference herein in their entirety. Rubbery polymers of this type are commercially available from The Goodyear Tire & Rubber Company and are sold as Sunigum® rubber.

The rubbery polymers which can be utilized in the polymeric compositions of this invention are synthesized utilizing a free radical emulsion polymerization technique and are comprised of repeat units which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene and (e) a crosslinking agent. The crosslinking agent is typically a multi-functional acrylate, a multi-functional methacrylate or divinylbenzene.

Technically, these rubbery polymers contain repeat units (chain linkages) which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene and (e) a crosslinking agent. These repeat units differ from the monomers that they were derived from in that they contain one less carbon-carbon double bond than is present in the respective monomer. In other words, a carbon-to-carbon double bond is consumed during the polymerization of the monomer into a repeat unit in the rubbery polymer. Thus, in saying that the rubbery polymer contains various monomers, in actuality means that it contains repeat units which are derived from those monomers.

As taught in U.S. Pat. No. 5,380,785, U.S. Pat. No. 5,415,940, and U.S. Pat. No. 5,462,993, the rubbery polymer can be synthesized utilizing a free radical emulsion polymerization technique and is comprised of repeat units which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene, (e) optionally, a half ester maleate soap and (e) a crosslinking agent.

The rubbery polymer will normally contain (a) from about 40 weight percent to about 80 weight percent butyl acrylate, or optionally a mixture of butyl acrylate and 2-ethylhexyl acrylate containing up to 40 weight percent 2-ethylhexyl acrylate, (b) from about 5 weight percent to about 35 weight percent methyl methacrylate, ethyl methacrylate, methyl acrylate or ethyl acrylate, (c) from about 4 weight percent to about 30 weight percent acrylonitrile, (d) from about 3 weight percent to about 25 weight percent styrene, (e) optionally, from about 0.5 weight percent to about 8 weight percent of a half ester maleate soap and (f) from about 0.25 weight percent to about 8 weight percent of a crosslinking agent.

Such rubbery polymers will preferably contain (a) from about 50 weight percent to about 80 weight percent butyl acrylate, or optionally a mixture of butyl acrylate and 2-ethylhexyl acrylate containing up to about 40 percent 2-ethylhexyl acrylate, (b) from about 3 weight percent to about 25 weight percent of at least one member selected from the group consisting of methyl methacrylate, ethyl methacrylate, methyl acrylate and ethyl acrylate, (c) from about 6 weight percent to about 30 weight percent acrylonitrile, (d) from about 5 weight percent to about 18 weight percent styrene, (e) optionally, from about 1 weight percent to about 5 weight percent of a half ester maleate soap and (f) from about 0.5 weight percent to about 4 weight percent of a crosslinking agent.

The rubbery polymer will more preferably be comprised of repeat units which are derived from (a) from about 55 weight percent to about 75 weight percent butyl acrylate, or optionally a mixture of butyl acrylate and 2-ethylhexyl acrylate containing up to about 40 percent 2-ethylhexyl acrylate, (b) from about 5 weight percent to about 20 weight percent of at least one member selected from the group consisting of methyl methacrylate, ethyl methacrylate, methyl acrylate and ethyl acrylate, (c) from about 10 weight percent to about 25 weight percent acrylonitrile, (d) from about 8 weight percent to about 14 weight percent styrene, (e) optionally, from about 2 weight percent to about 4 weight percent of a half ester maleate soap and (f) from about 1 weight percent to about 3 weight percent of a crosslinking agent. In one embodiment of this invention (note U.S. Pat. No. 5,380,785, U.S. Pat. No. 5,415,940, and U.S. Pat. No. 5,462,993) the reaction mixtures utilized in carrying out such polymerizations will typically contain from about 0.005 phm (parts per hundred parts of monomer by weight) to about 1 phm of at least one member selected from the group consisting of metal salts of alkyl sulfates and metal salts of alkyl sulfonates. It is generally preferred for the reaction mixture to contain from about 0.008 phm to about 0.5 phm of the metal salt of the alkyl sulfonate or the metal salt of the alkyl sulfate. It is normally more preferred for the reaction mixture to contain from about 0.05 phm to about 0.3 phm of the metal salt of the alkyl sulfonate or the metal salt of the alkyl sulfate. The percentages reported in this paragraph are based upon the total weight of the rubbery polymer.

The rubbery polymers used in the polymeric compositions of this invention are synthesized in an aqueous reaction mixture by utilizing a free radical polymerization technique. The reaction mixture utilized in this polymerization technique is typically comprised of water, a soap, the appropriate monomers, a suitable free radical initiator, and a crosslinking agent. The reaction mixture utilized in this polymerization technique will normally contain from about 10 weight percent to about 80 weight percent monomers, based upon the total weight of the reaction mixture. The reaction mixture will preferably contain from about 20 weight percent to about 70 weight percent monomers and will more preferably contain from about 40 weight percent to about 50 weight percent monomers.

The free radical polymerization technique utilized in this synthesis is normally initiated by including a free radical initiator in the reaction mixture. Virtually, any type of compound capable of generating free radicals can be utilized as the free radical initiator. The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate and acetyl cyclohexyl sulfonyl peroxide; the various azo compounds such as 2-t-butylazo-2-cyanopropane, dimethyl azodiisobutyrate, azodiisobutylronitrile, 2-t-butylazo-1-cyanocyclohexane and 1-t-amylazo-1-cyanocyclohexane; and the various alkyl perketals, such as 2,2-bis-(t-butylperoxy)butane. Water soluble peroxygen free radical initiators are especially useful in such aqueous polymerizations.

These emulsion polymerizations are typically carried out at the temperature ranging between about 60° F. (20° C.) and 190° F. (88° C.). At temperatures above about 88° C. alkyl acrylate monomers, such as butyl acrylate, have a tendency to boil. Thus, a pressurized jacket would be required for heating such alkyl acrylate monomers to temperatures in excess of about 88° C. On the other hand, at polymerization temperatures of less than about 55° C., a redox initiator system is required to insure satisfactory polymerization rates.

Many types of surfactants and dispersants can be employed in synthesizing the rubbery polymer. The sulfonate surfactants that are useful in such polymerizations are commercially available from a wide variety of sources. For instance, Du Pont sells sodium alkylarylsulfonate under the tradename Alkanol™, Browning Chemical Corporation sells sodium dodecylbenzene sulfonates under the tradename Ufaryl™ D1-85, and Ruetgers-Nease Chemical Company sells sodium cumene sulfonate under the tradename Naxonate Hydrotrope™. Some representative examples of sulfonate surfactants which can be used include sodium toluene-xylene sulfonate, sodium toluene sulfonate, sodium cumene sulfonates, sodium decyldiphenylether sulfonate, sodium dodecylbenzenesulfonate, sodium dodecyldiphenylether sulfonate, sodium 1-octane sulfonate, sodium tetradecane sulfonate, sodium pentadecane sulfonate, sodium heptadecane sulfonate and potassium toluene sulfonate.

Metal salts of alkylbenzene sulfonates are a highly preferred class of sulfonate surfactant. The metal will generally be sodium or potassium with sodium being preferred. Sodium salts of alkylbenzene sulfonates have the structural formula:

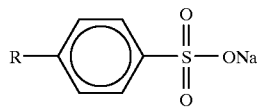

wherein R represents an alkyl group containing from 1 to about 20 carbon atoms. It is preferred for the alkyl group to contain from about 8 to about 14 carbon atoms.

The sulfonate surfactant can be a mixture of (mono) dialkylate ether disulfonates. The advantage of the disulfonate structure is that it contains two ionic charges per molecule instead of one as is the case with conventional alkyl sulfonate surfactants. Mixtures of (mono)dialkylate ether disulfates which are useful in the practice of this invention are commercially available from a wide variety of sources. For instance, Dow Chemical sells Dowfax™ alkylated disulfonated diphenyl oxides which are of the structural formula:

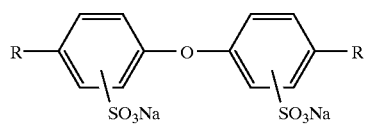

wherein R is an alkyl group which is typically $-C_6H_{13}$, $-C_{10}H_{21}$, $-C_{12}H_{25}$ or $-C_{16}H_{33}$. Sodium mono and di dodecyldiphenyloxide disulfonates are sold by American Cyanamid as DPOS-45 surfactants. Alpha-olefin sulfonate surfactants which are suitable for utilization in this invention are commercially available from Witco and Hoechst AG.

The sulfate surfactants which are useful in the practice of this invention include metal salts of alkylsulfates having the structural formula $ROSO_3X$ and metal salts of alkylethersulfates having the structural formula $RO-(CH_2CH_2O)_n-SO_3X$, wherein X represents a group Ia metal, such as sodium or potassium. Sodium lauryl sulfate, sodium ethanolamine lauryl sulfate and triethanolamine lauryl sulfate are representative examples of commercially available sulfate surfactants.

The half ester maleate soap utilized in the polymerization is prepared by reacting maleic anhydride with a fatty alcohol containing from about 10 to about 24 carbon atoms. It is typically preferred to utilize a fatty alcohol which contains from about 12 to about 16 carbon atoms. One mole of the maleic anhydride is reacted with one mole of the fatty alcohol in producing the half ester maleate soap. This reaction is typically conducted at a temperature which is within the range of about 50° C. to about 80° C. and can be depicted as follows:

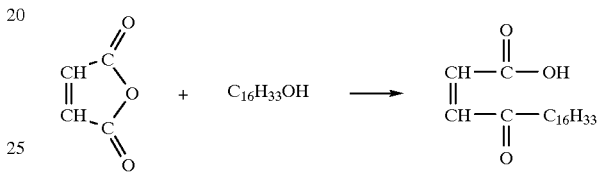

Sodium hydroxide or potassium hydroxide is then typically added to make the half ester maleate soap. This step can be depicted as follows:

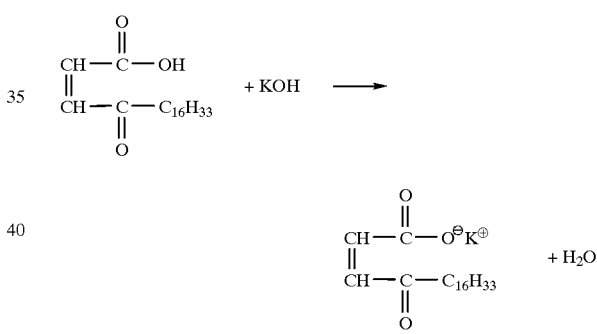

In synthesizing the rubbery polymer, a dispersant selected from the group consisting of aromatic formaldehyde condensation products and polycarboxylates will also typically be useful in the polymerization medium. The reaction mixtures utilized in carrying out such polymerizations will typically contain from about 0.1 phm (parts per hundred parts of monomer by weight) to about 5 phm of at least one member selected from the group consisting of metal salts of alkyl sulfates and metal salts of alkyl sulfonates, and from about 0.1 phm to about 5 phm of at least one dispersant selected from the group consisting of aromatic formaldehyde condensation products and polycarboxylates. It is generally preferred for the reaction mixture to contain from about 0.25 phm to about 4.25 phm of the metal salt of the alkyl sulfonate or the metal salt of the alkyl sulfate and from about 0.25 phm to about 4.25 phm of the dispersant selected from the group consisting of aromatic formaldehyde condensation products and polycarboxylates. It is normally more preferred for the reaction mixture to contain from about 0.4 phm to about 3.5 phm of the metal salt of the alkyl sulfonate or the metal salt of the alkyl sulfate, and from about 0.4 phm to about 3.5 phm of the dispersant selected from the group consisting of aromatic formaldehyde condensation products and polycarboxylates.

The dispersant utilized in the polymerizations of this invention are normally either aromatic formaldehyde condensation products or polycarboxylates. The aromatic formaldehyde condensation products are normally polysulfonates which are the reaction product of aromatic compounds and formaldehyde. Such aromatic formaldehyde condensation product soaps can be made by a relatively simple process. For example, in such a process, 200 parts of naphthalene is reacted with 200 parts of 98 percent sulfuric acid for 5 hours at a temperature of about 165°. The solution made is then subsequently cooled and diluted with 90 parts of water. Then 107 parts of a 30 percent formaldehyde solution is added and the mixture is stirred for 20 hours at a temperature of about 80° C. Toward the end of this reaction period the mixture is gradually heated to 100° C. Neutralization is subsequently carried out at 20° C. to 25° C. with about 165 to 180 parts of a 25 percent ammonia solution. The neutralization product is then filtered and, if necessary, dried in a vacuum drier.

Numerous variations of this synthesis are possible, and a wide range of aromatic compounds and their derivatives can react with aldehydes, ketones and compounds that eliminate aldehyde groups. For example, (a) dispersants produced by condensation of aromatic sulfonic acids and benzyl chloride or benzoin; (b) dispersants produced by condensation of various alkylarylsulfonic acids with a halogen arylsulfonic acid; and (c) dispersants produced by condensation of sulfonated phenols or 2-naphthols with formaldehyde and various nitrogen compounds.

Some representative examples of aromatic formaldehyde condensation products are shown below:

| Production Constituents | Structural Units |
|---|---|
| Naphthalene + $H_2SO_4$ + formaldehyde | 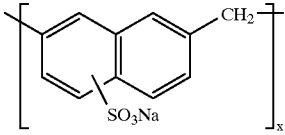 |
| Naphthalene + cresol + $H_2SO_4$ + formaldehyde | 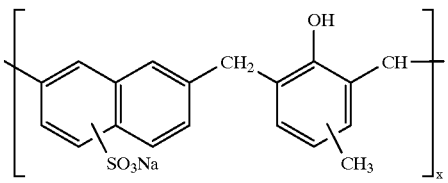 |
| Diphenyl ether + $H_2SO_4$ + formaldehyde | 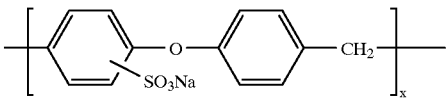 |
| Toluene + $H_2SO_4$ + formaldehyde | 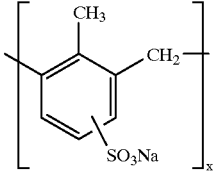 |
| Isopropylbenzene + $H_2SO_4$ + formaldehyde | 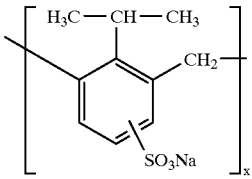 |
| Cresol + $H_2SO_4$ + formaldehyde | 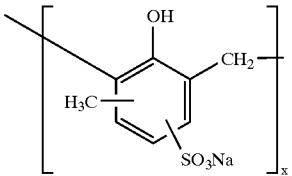 |

-continued

| Production Constituents | Structural Units |
|---|---|
| Phenol + formaldehyde + sodium sulfite | 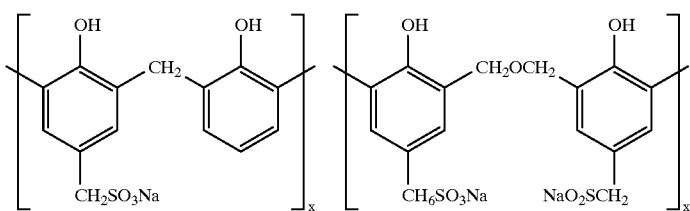 |
| Cyclohexanone + formaldehyde + sodium sulfite | 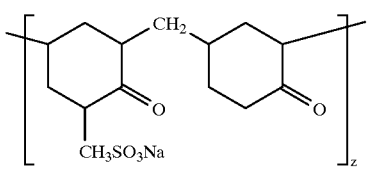 |
| Phenol + $H_2SO_4$ = formaldehyde | 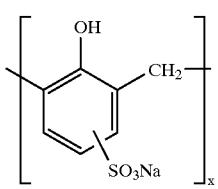 |

The carboxylate is also a water-soluble polymeric dispersing agent. For instance, methacrylic acid can be polymerized to yield water-soluble homopolymer which can be employed as a carboxylate dispersant. Copolymers with maleic acid, acrylic acid-maleic acid, maleic acid-methylvinyl ether and diisobutylene-maleic acid (DIBMA) are also very useful in the practice of this invention. Carboxylate dispersants are commercially available from a variety of sources.

The free radical emulsion polymerization utilized in synthesizing the rubbery polymer is typically conducted at a temperature which is within the range of about 10° C. to about 95° C. In most cases, the polymerization temperature utilized will vary between about 20° C. and about 80° C. The polymerization is carried out as a two-step batch process. In the first step, a seed polymer containing latex is synthesized. This is done by polymerizing (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile and (d) a crosslinking agent.

The seed polymer containing latex is typically prepared by the polymerization of a monomer mixture which contains about 40 to about 90 weight percent butyl acrylate, or optionally a mixture of butyl acrylate and 2-ethylhexyl acrylate containing up to about 40 percent 2-ethylhexyl acrylate, from about 5 to about 35 weight percent methyl methacrylate, ethyl methacrylate, methyl acrylate or ethyl acrylate, from about 2 to about 30 weight percent acrylonitrile, and from about 0.25 weight percent to 6 weight percent of the crosslinking agent. It is typically preferred for the monomeric component utilized in the first step to include about 50 weight percent to about 85 weight percent butyl acrylate, or optionally a mixture of butyl acrylate and 2-ethylhexyl acrylate containing up to about 40 percent 2-ethylhexyl acrylate, from about 5 weight percent to about 30 weight percent ethyl acrylate, ethyl methacrylate, methyl acrylate or methyl methacrylate, from about 4 weight percent to about 28 weight percent acrylonitrile, and from about 0.5 weight percent to about 4 weight percent of the crosslinking agent. It is generally more preferred for the monomer charge composition used in synthesizing the seed polymer latex to contain from about 60 weight percent to about 80 weight percent butyl acrylate, or optionally a mixture of butyl acrylate and 2-ethylhexyl acrylate containing up to about 40 percent 2-ethylhexyl acrylate, from about 5 weight percent to about 25 weight percent methyl methacrylate, ethyl methacrylate, methyl acrylate or ethyl acrylate, from about 5 weight percent to about 25 weight percent acrylonitrile, and from about 1 to about 3 weight percent crosslinking agent.

After the seed polymer latex has been prepared, styrene monomer, additional acrylonitrile monomer and additional crosslinking agent is added to the seed polymer containing latex. As a general rule, from about 4 parts by weight to about 30 parts by weight of styrene, from about 1 part by weight to about 20 parts by weight of additional acrylonitrile, and from about 0.01 to 2 parts by weight of the crosslinking agent will be added. In this second stage of the polymerization, it is preferred to add from about 6 parts by weight to about 22 parts by weight of styrene, from about 3 parts by weight to about 12 parts by weight of acrylonitrile, and from about 0.05 parts by weight to 1 part by weight of the crosslinking agent. It is typically more preferred for from about 10 parts by weight to about 17 parts by weight of styrene, from about 4 parts by weight to about 8 parts by weight of acrylonitrile, and from about 0.1 parts by weight to about 0.5 parts by weight of the crosslinking agent to be added to the seed polymer latex to initiate the second phase of the polymerization.

A wide variety of crosslinking agents can be utilized in the synthesis of the rubbery polymer. Some representative examples of crosslinking agents which can be utilized include difunctional acrylates, difunctional methacrylates, trifunctional acrylates, trifunctional methacrylates and divinylbenzene. Some specific examples of crosslinking agents which can be used include ethylene glycol methacrylate, divinylbenzene and 1,4-butanediol dimethacrylate. In practice, 1,4-butanediol dimethacrylate has proven to be particularly useful as the crosslinking agent.

In most cases, the polymerization will be continued until a high monomer conversion has been attained. At this point, the rubbery polymer made by the two-step batch polymerization process is recovered from the emulsion (latex). This can be accomplished by utilizing standard coagulation techniques. For instance, coagulation can be accomplished by the addition of salts, acids or both to the latex.

After the rubbery polymer is recovered by coagulation, it is dried. It is sometimes advantageous to convert the rubbery polymer into a powder to facilitate its usage. In this case, it will be beneficial to add a partitioning agent to the rubbery polymer. Some representative examples of partitioning agents which can be employed include calcium carbonate, emulsion polyvinyl chloride and silica. Calcium carbonate is a highly desirable partitioning agent which can be utilized in such applications.

A wide variety of thermoplastic resins can be employed in the polymeric compositions of this invention. For instance, the thermoplastic resin can be a halogenated thermoplastic resin or it can be a halogen-free thermoplastic. Some representative examples of thermoplastic resins which can be utilized include polyvinylchloride (PVC), chlorinated polyethylene, vinylacetate graft polyvinylchloride, butylacetate graft polyvinylchloride, ethylenevinylacetate, ethylenevinylacetate/carbon monoxide copolymer, ethylene/butylacrylate/carbon monoxide terpolymer, polyethylene, polypropylene, ABS resins, acrylonitrile/styrene/acrylonitrile block copolymers (ASA resins), styrene/butadiene/styrene block copolymers (SBS resins), styrene/ethylene-butylene/styrene block terpolymer resins (SEBS resins), thermoplastic polyurethane resins and nylon resins. The ABS resins which can be used are amorphous thermoplastics synthesized by polymerizing acrylonitrile, butadiene and styrene. ABS resins are normally made by polymerizing 1,3-butadiene monomer into polybutadiene after which styrene and acrylonitrile monomers are added and polymerized (grafted) onto the polybutadiene. SEBS resins have proven to be very useful in the practice of this invention.

The polyhydroxy alcohol can be virtually any type of compound or polymer which contains 2 or more hydroxyl groups. For example, the polyhydroxy alcohol can be a glycol of the formula HO$-$(CH$_2$)$_n$OH wherein n is an integer from 2 to about 20. Ethylene glycol is a representative example of a highly preferred glycol. The polyhydroxy alcohol can also be a polyethylene glycol of the formula HO$-$(CH$_2$—CH$_2$—O)$_n$H wherein n is an integer from 2 to about 10. Triethylene glycol, which is also known as 2,2'-ethylenedioxybis(ethanol), is a representative example of a highly preferred polyethylene glycol. Glycerol, which is also known as 1,2,3-propanetriol, is a representative example of a polyhydroxy alcohol which contains three hydroxyl groups.

The polymeric compositions of this invention will normally contain from about 20 weight percent to about 90 weight percent of the rubbery polymer and from about 10 weight percent to about 80 weight of the thermoplastic resin. The polymeric composition will more typically contain from about 35 weight percent to about 80 weight percent of the rubbery polymer and from about 20 weight percent to about 65 weight of the thermoplastic resin. The polymeric composition will preferably contain from about 50 weight percent to about 70 weight percent of the rubbery polymer and from about 30 weight percent to about 50 weight of the thermoplastic resin.

The amount of polyhydroxy alcohol added will vary with the specific polyhydroxy alcohol used and with the degree of cure desired. Naturally, less polyhydroxy alcohol can be used if it contains multiple hydroxyl groups than in cases where a polyhydroxy alcohol which contains only two hydroxyl groups is utilized. However, the amount of polyhydroxy alcohol added will typically be within the range of about 0.5 phr to about 10 phr (parts by weight per 100 parts by weight of the rubber). In most cases, the polyhydroxy alcohol will be added in an amount which is within the range of about 1 phr to about 8 phr. It is typically preferred from the amount of polyhydroxy alcohol utilized to be within the range of about 2 phr to 7 phr.

The polymeric compositions of this invention are made by mixing the rubbery polymer, the thermoplastic resin and the polyhydroxy alcohol and dynamically vulcanizing them at a elevated temperature. Dynamic vulcanization differs from conventional static vulcanization techniques in that the vulcanization occurs during mixing or mastication of the composition being prepared. Dynamic vulcanization is typically carried out under the high shearing forces necessary for thorough mixing of the rubbery polymer, the thermoplastic resin and the polyhydroxy alcohol. The dynamic vulcanization is carried out at a temperature which is adequate to vulcanize the blend. This temperature will normally be within the range of about 100° C. to about 220° C. In most cases, the dynamic vulcanization will be conducted at a temperature which is within the range of about 120° C. to about 210° C. It is normally preferred for the dynamic vulcanization to be conducted at a temperature from about 130° C. to about 200° C.

This invention is illustrated by the following example which is merely for the purpose of illustration and are not to be regarded as limiting the scope of the invention or the manner in which it can be practiced. Unless specifically indicated otherwise, parts and percentages are given by weight.

EXAMPLE 1

In this experiment, a polymeric composition having excellent characteristics for seals and gaskets was made utilizing the techniques of this invention. In the procedure used, a dry blend containing 50 parts of Kraton® G SEBS block copolymer, 2.5 parts of triethylene glycol and 1.3 parts of Irgastab® T161 dialkyltin carboxylate catalyst was blended at a temperature of 180–210° C. with 50 parts of Sunigum® SNP7395 rubbery polymer in a Haake Rheocord 90 operated at 50–100 rpm over a period of 25–30 minutes. During the mixing, the rubbery polymer became dynamically vulcanized by the action of curatives and dispersed in the continuous phase of the unvulcanized SEBS block copolymer. After dynamic vulcanization, the composition was fluxed at 180° C. for 6 minutes on a mill and molded at 180° C. for 10 minutes.

Physical testing showed that the dynamically vulcanized composition had a Shore A hardness of 64, a tensile strength of 7.5 MPa, a 50 percent modulus of 1.8 MPa, a 100 percent modulus of 3.2 MPa, an elongation at break of 217 percent, a tear strength of 16.64 KN/m and a compression set (22 hours at 70° C.) of 48. It should be noted, that without the triethyleneglycol, which promoted the dynamic vulcanization, the composition had a Shore A hardness of 60, a tensile strength of 5.4 MPa, a 50 percent modulus of 1.7 MPa, a 100 percent modulus of 2.6 MPa, an elongation at break of 369 percent, a tear strength of 15.83 KN/m and a compression set (22 hours at 70° C.) of 76. Thus, the dynamic vulcanization greatly reduced the amount of compression set experienced without sacrificing other physical characteristics. The polymeric composition made had excellent characteristics for utilization in making seals and gaskets.

EXAMPLE 2

The procedure described in Example 1 was repeated in this experiment except for the fact that the blend was made by mixing 50 parts of the rubbery polymer, 50 parts of the SEBS block copolymer, 2.5 parts of the triethylene glycol, and 1.3 parts of the dialkyltin carboxylate catalyst. The dynamically vulcanized composition made had a Shore A hardness of 66, a tensile strength of 7.9 MPa, a 50 percent modulus of 1.8 MPa, a 100 percent modulus of 2.7 MPa, an elongation at break of 323 percent, a tear strength of 7.41 KN/m and a compression set (22 hours at 70° C.) of 57. Without the triethyleneglycol, which promoted the dynamic vulcanization, the composition had a Shore A hardness of 62, a tensile strength of 5.1 MPa, a 50 percent modulus of 1.6 MPa, a 100 percent modulus of 2.1 MPa, an elongation at break of 460 percent, a tear strength of 15.83 KN/m and a compression set (22 hours at 70° C.) of 76. The polymeric composition made again proved to have excellent characteristics for utilization in making seals and gaskets.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A window glazing gasket which is comprised of a vulcanized blend of (1) a rubbery polymer which is comprised of repeat units which are derived from (a) butyl acrylate, (b) at least one member selected from the group consisting of methyl methacrylate, ethyl methacrylate, methyl acrylate, and ethyl acrylate, (c) acrylonitrile, (d) styrene, and (e) a crosslinking agent; (2) a thermoplastic styrene/ethylene-butylene/styrene resin; and (3) at least one glycol component selected from the group consisting of ethylene glycol and triethylene glycol.

2. A window glazing gasket as specified in claim 1 wherein the glycol component is ethylene glycol.

3. A window glazing gasket as specified in claim 1 wherein the glycol component is triethylene glycol.

4. A window glazing gasket as specified in claim 1 wherein the rubbery polymer is further comprised of repeat units which are derived from a half ester maleate soap.

5. A polymeric composition as specified in claim 4 wherein the rubbery polymer is comprised of repeat units which are derived from about 40 to about 80 weight percent butylacrylate, from about 5 to about 35 weight percent of a member selected from the group consisting of methyl methacrylate, ethyl methacrylate, methyl acrylate and ethyl acrylate, from about 4 to about 30 weight percent acrylonitrile, from about 3 to about 25 weight percent styrene, from about 0.5 to about 8 weight percent half ester maleate soap and from about 0.25 to about 8 weight percent crosslinking agent.

6. A polymeric composition as specified in claim 4 wherein the rubbery polymer is further comprised of repeat units which are derived from 2-ethylhexyl acrylate and wherein the rubbery polymer contains repeat units which are derived from about 50 to about 80 weight percent butylacrylate, or optionally a mixture of butyl acrylate and 2-ethylhexyl acrylate containing up to about 40 percent 2-ethylhexyl acrylate, from about 3 to about 25 weight percent of a member selected from the group consisting of methyl methacrylate, ethyl methacrylate, methyl acrylate and ethyl acrylate, from about 6 to about 25 weight percent acrylonitrile, from about 5 to about 18 weight percent styrene, from about 1 to 5 weight percent half ester maleate soap and from about 0.5 to about 4 weight percent crosslinking agent.

7. A polymeric composition as specified in claim 4 wherein the rubbery polymer is further comprised of repeat units which are derived from 2-ethylhexyl acrylate and wherein the rubbery polymer is comprised of repeat units which are derived from 55 to about 75 weight percent butyl acrylate, or optionally a mixture of butyl acrylate and 2-ethylhexyl acrylate containing up to about 40 percent 2-ethylhexyl acrylate, from about 5 to about 20 weight percent methylmethacrylate, from about 10 to about 14 weight percent acrylonitrile, from about 8 to about 14 weight percent styrene, from about 2 to about 4 weight percent half ester maleate soap and from about 1 to about 3 weight percent crosslinking agent.

8. A polymeric composition as specified in claim 7 wherein the crosslinking agent is one or more members selected from the group consisting of divinylbenzene and 1,4-butanediol dimethacrylate.

9. A polymeric composition as specified in claim 5 wherein the blend is comprised of about 20 weight percent to about 90 weight percent of the rubbery polymer and from about 10 weight percent to about 80 weight percent of the thermoplastic resin.

10. A polymeric composition as specified in claim 6 wherein the blend is comprised of about 35 weight percent to about 80 weight percent of the rubbery polymer and from about 20 weight percent to about 65 weight percent of the thermoplastic styrene/ethylene-butylene/styrene resin.

11. A polymeric composition as specified in claim 8 wherein the blend is comprised of about 50 weight percent to about 70 weight percent of the rubbery polymer and from about 30 weight percent to about 50 weight percent of the thermoplastic styrene/ethylene-butylene/styrene resin.

12. A polymeric composition as specified in claim 10 wherein from about 1 phr to about 8 phr of the glycol component is present.

13. A polymeric composition as specified in claim 11 wherein from about 2 phr to about 7 phr of the glycol component is present.

14. A polymeric composition as specified in claim 13 wherein said polymeric composition is made by dynamic vulcanization.

15. A process as specified in claim 14 wherein the thermoplastic resin is a styrene/ethylene-butylene/styrene block terpolymer.

16. A process as specified in claim 15 wherein the rubbery polymer is comprised of repeat units which are derived from about 40 to about 80 weight percent butylacrylate, from about 5 to about 35 weight percent of a member selected from the group consisting of methyl methacrylate, ethyl methacrylate, methyl acrylate and ethyl acrylate, from about 4 to about 30 weight percent acrylonitrile, from about 3 to about 25 weight percent styrene, from about 0.5 to about 8 weight percent half ester maleate soap and from about 0.25 to about 8 weight percent crosslinking agent.

17. A process as specified in claim 16 wherein the blend is comprised of about 35 weight percent to about 80 weight percent of the rubbery polymer and from about 20 weight percent to about 65 weight percent of the thermoplastic styrene/ethylene-butylene/styrene resin; and wherein from about 1 phr to about 8 phr of the glycol component is present.

18. A process as specified in claim 3 wherein the rubbery polymer is further comprised of repeat units which are derived from 2-ethylhexyl acrylate and wherein the rubbery polymer is comprised of repeat units which are derived from 55 to about 75 weight percent butyl acrylate, or optionally a mixture of butyl acrylate and 2-ethylhexyl acrylate containing up to about 40 percent 2-ethylhexyl acrylate, from about 5 to about 20 weight percent methylmethacrylate, from about 10 to about 14 weight percent acrylonitrile, from about 8 to about 14 weight percent styrene, and from about 1 to about 3 weight percent crosslinking agent; wherein the crosslinking agent is one or more members selected from the group consisting of divinylbenzene and 1,4-butanediol dimethacrylate; wherein the blend is comprised of about 50 weight percent to about 70 weight percent of the rubbery polymer and from about 30 weight percent to about 50 weight percent of the thermoplastic resin and wherein from about 2 phr to about 7 phr of the glycol component is present.

* * * * *